United States Patent [19]

Vilches

[11] Patent Number: 4,473,954
[45] Date of Patent: Oct. 2, 1984

[54] SYMMETRIC BODY

[76] Inventor: Jose I. Vilches, 13 Seventh Ave., Passaic, N.J. 07055

[21] Appl. No.: 448,522

[22] Filed: Dec. 10, 1982

[51] Int. Cl.³ .......................................... G01B 5/255
[52] U.S. Cl. ........................ 33/174 R; 33/180 AT; 33/288; 33/1 LE
[58] Field of Search ............... 33/174 R, 174 P, 1 PT, 33/1 MP, 1 LE, 138–139, 288, 203, 203.15, 203.18, 392, 193, 180 AT, 181 AT

[56] References Cited

U.S. PATENT DOCUMENTS

| | | | |
|---|---|---|---|
| 2,386,884 | 10/1945 | Carlson | 33/1 LE |
| 3,248,794 | 5/1966 | Curry | 33/1 LE |
| 4,204,333 | 5/1980 | Blerk | 33/288 |
| 4,249,314 | 2/1981 | Beck | 33/1 PT X |
| 4,302,883 | 12/1981 | MacGregor | 33/180 AT |
| 4,330,945 | 5/1982 | Eck | 33/288 |

*Primary Examiner*—Harry N. Haroian
*Attorney, Agent, or Firm*—M. K. Silverman

[57] ABSTRACT

There is disclosed herein a gauge for aligning opposite points within opposite surfaces of a normally symmetric body. The gauge comprises an elongated guidebar disposed above and upon the symmetric body. The guidebar is also perpendicularly transverse to the plane of symmetry of the symmetric body. Also included are left and right calibration assemblies which are slideably disposed upon and within opposite halves of the guidebar, each of the calibration assemblies themselves include an X- and Y-axis joystick connected, in each axis, to respective means for converting linear physical displacement of the joystick to corresponding electrical output signals. The gauge also includes means for electrically expressing and comparing the respective left and right X-axis output signals and the respective left and right Y-axis output signals, wherein, through the use of reiterative output-to-input feedback adjustments of points upon one of said opposite surfaces, the respective left and right sides of a normally symmetric body may be, by such reiterative adjustments, brought into accurate alignment with each other.

4 Claims, 6 Drawing Figures

SYMMETRIC BODY

BACKGROUND OF THE INVENTION

The present invention relates to gauges for aligning opposite surfaces of a normally symmetric body in which a surface thereof has been subject to a collision as, for example, a collision between automotive vehicles or between a vehicle and an object.

A historic and chronic problem in the vehicle body repair business has been that of accurately and precisely restoring the damaged side of the vehicle to dimensions and coordinates that are precisely symmetrical to those of the undamaged side of the vehicle. This general method is known as reference dimensioning and, in this approach, it is necessary to assume that the undamaged portion of the vehicle constitutes a proper reference plane. This assumption is generally correct in those cases where the longitudinal axis of the vehicle has not been bent, and it is to this class of vehicle body repair problems that the present invention is directed.

In the use of prior art reference dimensioning methods, it was necessary to take actual measurements from the undamaged portion of the vehicle and, as well, to rely upon visual comparison of the measurements taken from opposite normally symmetrical surfaces of the vehicle body. This prior art method, while theoretically sound, has been found to be extremely tedious and time-consuming to execute properly in that dozens of reference points, in a typical repair situation, need to be compared in order to assure that the normally symmetrical opposite body surfaces are in fact symmetrical.

The prior art in the present field is exemplified by such patents as U.S. Pat. No. 3,786,572 to Larson and U.S. Pat. No. 4,302,882 to MacGregor. This prior art is more particularly applicable to the straightening of automobile frames and other structural members, as opposed to the alignment and restoration of damaged portions of the vehicle body.

SUMMARY OF THE INVENTION

The present invention is directed to a gauge for aligning opposite points within opposite surfaces of a normally symmetric body, this gauge including: an elongated guide bar disposed above and upon the symmetric body and perpendicularly transverse to the plane of symmetry of the body; left and right calibration assemblies are slideably disposed upon and within opposite halves of said guide bar, each of said calibration assemblies comprising X- and Y-axis joysticks connected in each axis to respective means for converting linear physical displacement of the joysticks to corresponding electrical output signals; and means for electrically expressing and comparing the respective left and right X-axis output signals and the respective left and right Y-axis output signals, whereby through reiterative output-to-input feedback adjustments of points upon one of the opposite surfaces of the symmetric body, the respective left and right sides of the normally symmetric body can become thereby aligned.

It is an object of this invention to provide a gauge for aligning opposite surfaces of a normally symmetric body, such as a vehicle body, if damage has occurred to one of the normally symmetric surfaces thereof.

It is a further object of the invention to provide an electronic means for reference dimensioning or comparison of a damaged surface of a vehicle body with an undamaged surface.

It is a yet further object to provide a means by which the time and effort involved in the use of reference dimensioning in the repair of a vehicle body can be substantially reduced.

A further object is to provide an electronically defined horizontal datum plane from which comparative measurements of the damaged and undamaged sides of the vehicle body can be quickly and accurately accomplished.

Other objects and advantages will appear in the course of the hereinafter set forth drawings, specification, and claims.

DETAILED DESCRIPTION OF THE INVENTION

Figure 1:
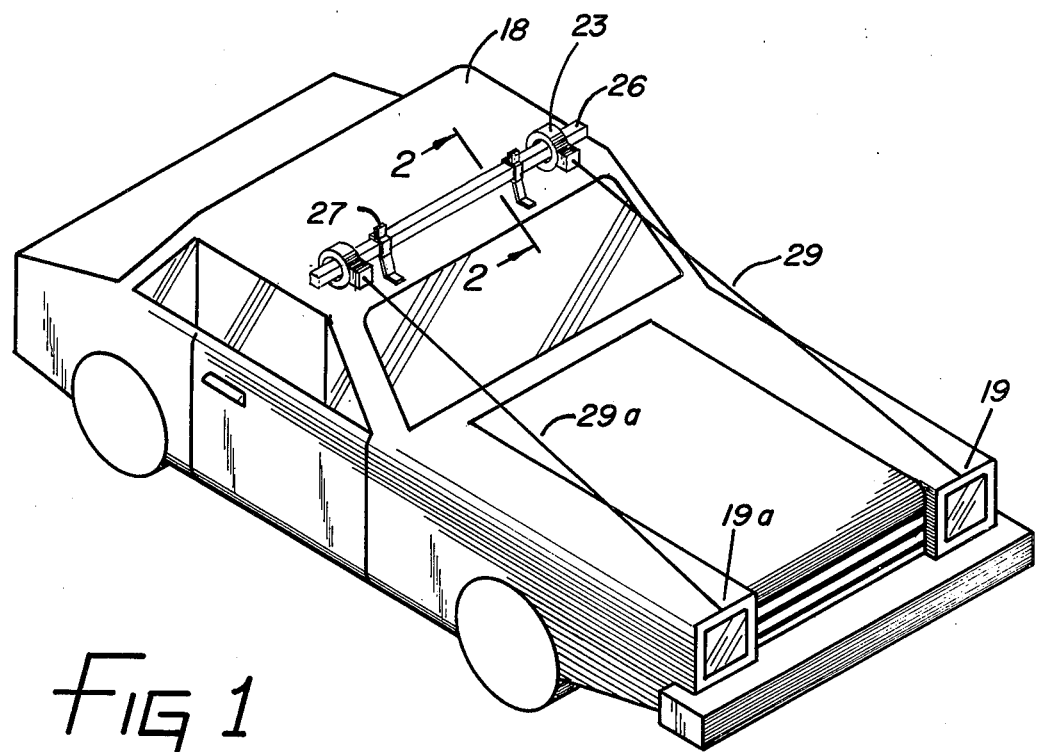
FIG. 1 is a perspective view of the present gauge attached to the roof of an automobile, as the gauge would appear in actual operation.
Figure 2:
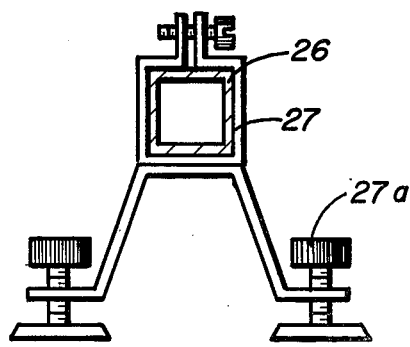
FIG. 2 is a side cross-sectional view of the guidebar support bracket.

With reference to FIG. 1, there is shown an elongated guidebar 26 which is disposed above and upon an automobile body 18. It is noted that the guidebar 26 is disposed perpendicularly transverse to the principal horizontal plane of the automobile body. Additionally, it is necessary for the guidebar 26 to be perfectly level with respect to said horizontal plane. This leveling process is accomplished through the use of a pair of leveling brackets, one of which is shown in cross-sectional view in FIG. 2. The leveling brackets each consist of a collar element 27 and a pair of adjustable offset elements 27a. By adjustment of the front and/or back offset elements (on both the left and right side of the guidebar) the longitudinal axis of the guidebar can be placed into parallel, level alignment with the horizontal plane of the vehicle as measurement at an undamaged symmetric area of the vehicle, e.g., the rear of the vehicle wherein damage has occurred at the front.

Also shown in FIG. 1 is the general shape of each calibration assembly 23. Further shown are the elastic strings 29 and 29a which are connected to each calibration assembly. The elastic strings are of equal length and, at the ends 19 and 19a thereof are provided with appropriate gripping means (not shown) that enable the ends of the elastic strings to be conveniently held against that point 19 of the damaged but normally symmetric surface of the vehicle is to be compared with its corresponding opposite point 19a on the vehicle.

Figure 4:
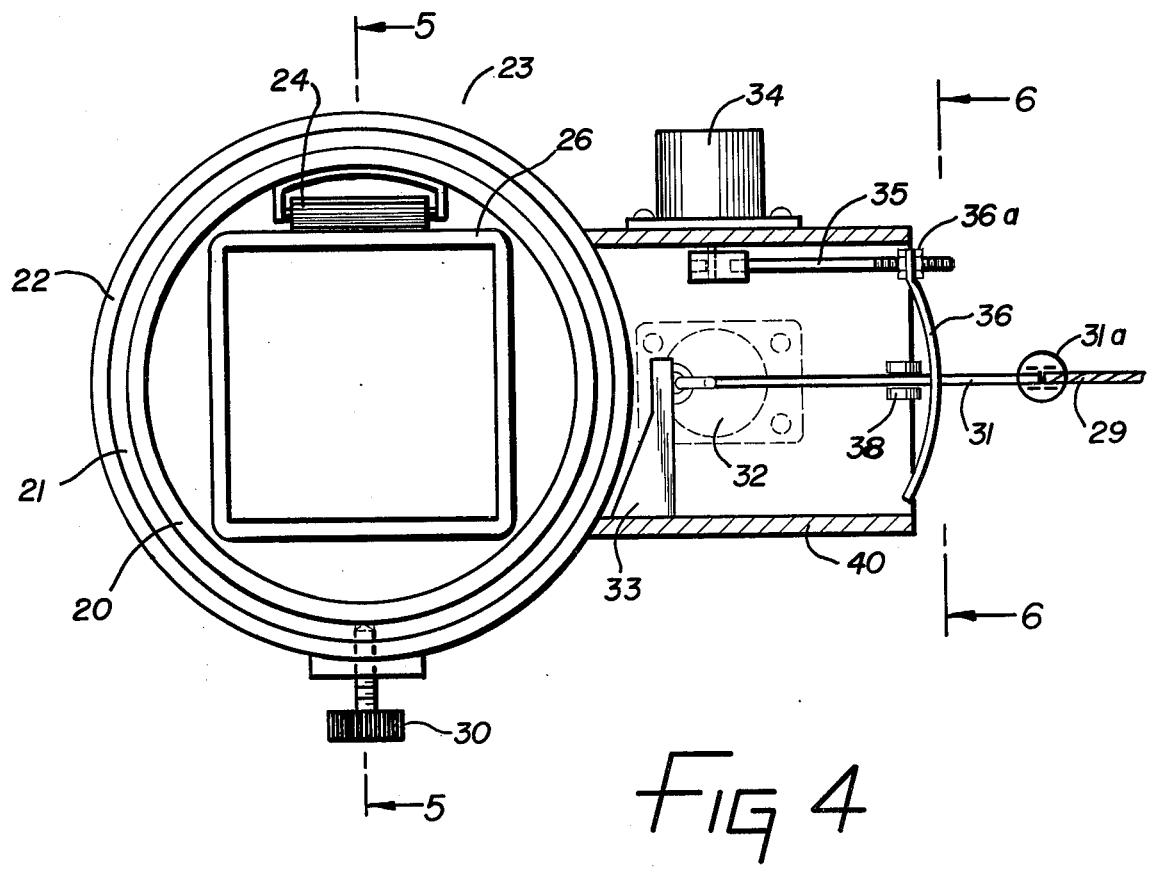
FIG. 4 is a radial cross-sectional view of one of the calibration assemblies.
Figure 5:
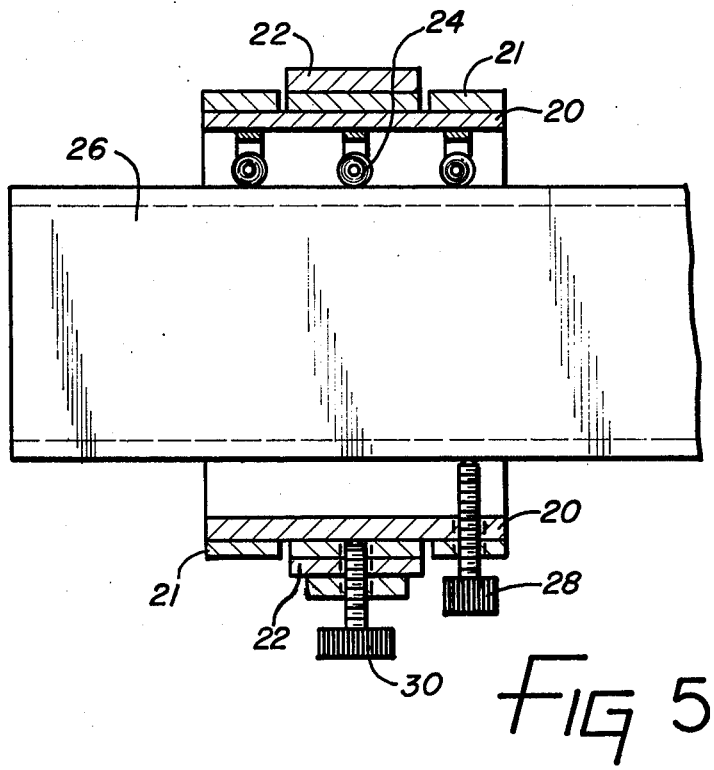
FIG. 5 is a longitudinal cross-sectional view of the calibration assembly taken through line 5—5 of FIG. 4.
Figure 6:
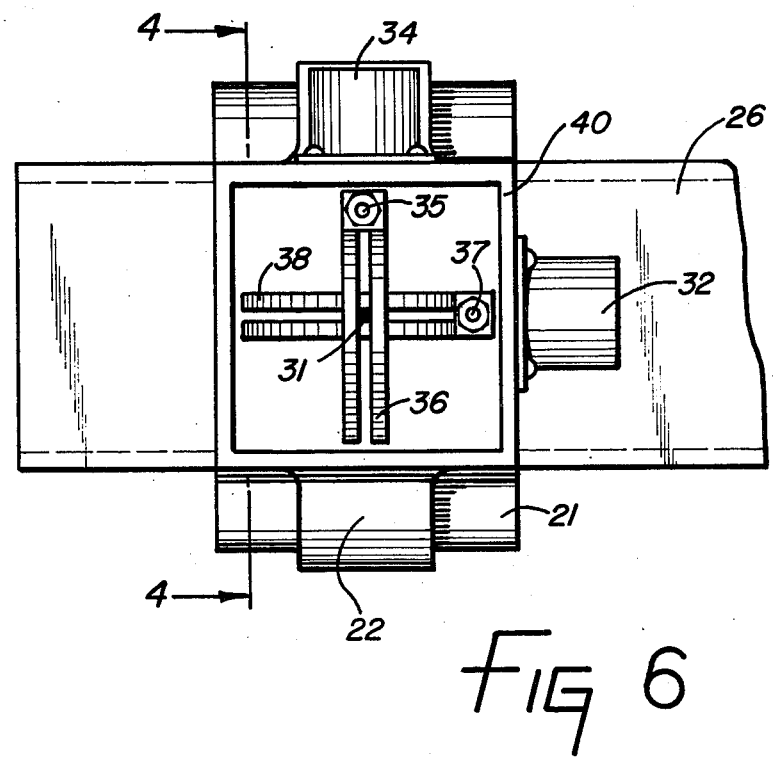
FIG. 6 is a front plan view of a calibration assembly taken from the direction of line 6—6 of FIG. 4.

FIGS. 4, 5 and 6 are views through different planes of the calibration assembly.

With specific reference to FIG. 4, the guidebar 26 is shown with respect to the surrounding positioning means of the calibration assembly 23. More particularly, the positioning means consists of three concentric cylindrical collars, namely, an inner collar 20, an intermediate collar 21 and an outer collar 22. The inner collar 20 is supported by roller element 24 which rolls upon the guidebar 26. An adjustability of the outer collar 22 relative to the inner collar 20 is attained by means of the set screw 30. Similarly an adjustability of the entire positioning assembly relative to the elongated guidebar 26 is obtained through the use of set screw 28 (see FIG. 5) in which the longitudinal relationship between the various collar assemblies, the roller 24, and the guidebar 26 are shown.

In FIG. 6 is shown the calibration assembly 23 which includes an X- and Y-axis joystick 31. The position of the joystick 31 is controlled by the elastic string 29 to which it is rigidly attached (see FIG. 4) by ring 31a. The position of the elastic string 29 is (as shown in FIG. 1) determined by the point at which the end 19 of the elastic string 29 is placed. The movement of the joystick 31 will bring about corresponding movement of the vertical caliper 36 and the horizontal caliper 38. Such movement of the vertical and horizontal calipers will cause corresponding movements of the arms 35 and 37 to which the respective calipers 36 and 38 are connected. Movement of said arms 35 and 37 (see FIGS. 4 and 6) will cause a rotation of the axial control arms of the horizontal potentiometer 34 and vertical potentiometer 32. Thereby, movement of the joystick 31 will bring about a change in the resistance of the respective horizontal and vertical potentiometers and, thereby, will produce an electrical output signal which corresponds to the linear physical displacement in the X and Y directions of the joystick 31. The potentiometers 32 and 34 are connected to the digital display of FIG. 3 in which the electrical analog outputs of said potentiometers are converted to digital readings which correspond to the position of the ends 19 and 19a of the elastic strings 29 and 29a upon the surface of the symmetric body. The horizontal or X-axis readings appear at the bottom of the display, while the vertical or Y-axis readings appear at the top of the display. Accordingly, by reiteratively taking readings of the position of the damaged side of the vehicle (in the present example, the right side) and, thereupon, utilizing the output information of FIG. 3 in order to hammer, bend, or otherwise change the shape or position of the point 19, said point 19 will eventually become aligned with point 19a whereupon the readings at both the left and the right side of the digital display will be identical.

Figure 3:
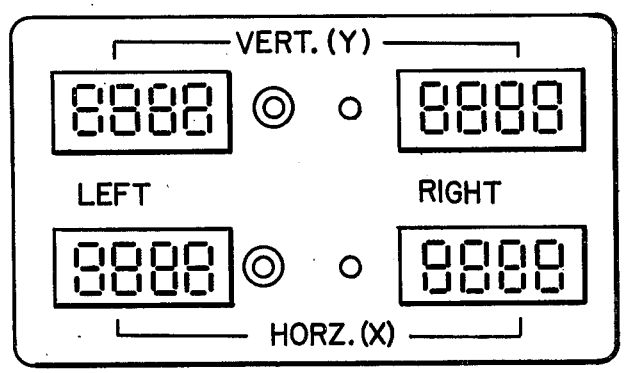
FIG. 3 is a schematic representation of a digital readout from the present gauge.

It is to be appreciated that the positional readings obtained on the right side of the display of FIG. 3 are meaningful only with reference to the set of readings which appear for the left, undamaged side of the vehicle. Therefore, it is to be appreciated, that through the use of the present system, the user may quickly and accurately compare as many points on the damaged side of the vehicle as he wishes with corresponding points upon the undamaged side. Additionally, successive changes, as by techniques of hammering, bending or otherwise deforming the metal of the damaged side of the vehicle may be accomplished with a high degree of certainty that, after the last reiteration has been accomplished, the damaged area of the vehicle has been restored to virtually perfect symmetry to the left, undamaged side of the vehicle.

It is noted that each potentiometer is provided with a support element which in turn is connected to an external housing. More particularly, the vertical potentiometer 32 is connected to a vertical support element 33 which in turn is connected to an external housing 40 which itself connects to the outer collar 22 of the positioning means. It is to be understood that the positioning means makes possible the positioning of the respective calibration assemblies at different points along the guidebar 26. However, in each position, the respective calibration means must be equidistantly disposed from the plane of symmetry of the vehicle body which, identically, is the same as the center point of the longitudinal axis of the guidebar 26.

The nuts surrounding the bars 35 and 37 (see FIGS. 4 and 6) are used to calibrate the arms 36 and 38 into approximately the same plane.

In order to take measurements toward the rear of a vehicle body, each calibration assembly 23 would be rotated 180 degrees about the guidebar 26 and, thereafter, would be operated in exactly the same fashion as set forth above. However, there are certain positions on the automobile for which it will be necessary to move the guidebar 26 to a more rearward area of the roof of the vehicle.

It is to be appreciated that the above is a generalized method for aligning opposite points within opposite surfaces of a nornally symmetric body and, as such, it will be of value in a variety of metal and material working applications.

While there have been shown and described the preferred embodiments of the present invention, it will be understood that the invention may be embodied otherwise than as herein specifically illustrated or described and that within said embodiments certain changes in the detail and construction, and the form and arrangement of the parts may be made without departing from the underlying ideas or principles of this invention within the scope of the appended claims.

Having thus described my invention, what I claim as new, useful and non-obvious and accordingly, secure by Letters Patent of the United States is:

1. A gauge for aligning opposite points of and within opposite surfaces of a normally symmetric body, comprising:
    (a) an elongated guidebar disposed perpendicularly transverse to the plane of symmetry of said body;
    (b) left and right calibration assemblies slideably disposed upon and within opposite halves of said guidebar, each of said calibration assemblies containing a joystick having horizontal and vertical axes and connected in each of said axes to respective means for converting linear physical displacement of said joysticks to corresponding electrical output signals, and each having an elastic reference string attached to the end of said joysticks to enable easy and quick ascertainment of points of reference; and
    (c) means for electronically expressing and comparing said respective left/right, horizontal/vertical output signals,
    whereby through reiterative output-to-input feedback adjustments of points upon one of said opposite surfaces, the respective left and right sides of the normally symmetric body may be aligned.

2. The gauge as recited in claim 1 in which said calibration assemblies further comprise:
    (a) horizontal and vertical calipers positionally responsive to respective horizontal and vertical movement of said joysticks; and
    (b) axially controlled potentiometers connected to each of said horizontal and vertical calipers such that linear motion of said calipers is translated into rotational motion of control shafts of said potentiometers which, in turn, is translated into electrical analog output signals, said output signals being proportional in amplitude to the linear movement of the respective horizontal and vertical calipers.

3. The gauge as recited in claim 2 further comprising means for converting the analog output signals of said potentiometers into digital displays on a monitor, yielding horizontal and vertical coordinates of the left and right ends of said elastic strings, to thereby obtain a simultaneous comparison of the actual position of opposite points within opposite surfaces of the otherwise normally symmetric body.

4. The gauge as recited in claim 3 in which said calibration assembly further comprises means for slideable adjustment along said elongated guidebar, said means comprising a plurality of concentric cylindrical sleeves, said sleeves including mans for securement thereof relative to each other and relative to said guidebar.

* * * * *